US012153360B1

(12) United States Patent
Kasukawa

(10) Patent No.: US 12,153,360 B1
(45) Date of Patent: Nov. 26, 2024

(54) IMAGE FORMING APPARATUS

(71) Applicant: TOSHIBA TEC KABUSHIKI KAISHA, Tokyo (JP)

(72) Inventor: Masayuki Kasukawa, Saitama (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/355,561

(22) Filed: Jul. 20, 2023

(51) Int. Cl.
*G03G 15/16* (2006.01)
*G03G 15/02* (2006.01)

(52) U.S. Cl.
CPC ..... *G03G 15/1615* (2013.01); *G03G 15/0225* (2013.01); *G03G 15/0233* (2013.01); *G03G 2215/00354* (2013.01); *G03G 2215/00713* (2013.01)

(58) Field of Classification Search
CPC ........... G03G 15/1615; G03G 15/0225; G03G 15/0233; G03G 2215/00354; G03G 2215/00713; G03G 15/0216
See application file for complete search history.

(56) References Cited

U.S. PATENT DOCUMENTS 5,208,634 A 5/1993 Ikemoto et al.
5,294,960 A 3/1994 Nomura et al.
5,470,635 A 11/1995 Shirai et al.
5,488,459 A 1/1996 Tsuda et al.
5,602,623 A 2/1997 Nishibata et al.
5,926,672 A 7/1999 Nishibata et al.
2007/0183809 A1* 8/2007 Ishikawa ............ G03G 15/0225 399/176
2017/0307995 A1* 10/2017 Tsuchiya ............ G03G 15/0233
2019/0317446 A1* 10/2019 Imanaka ............ G03G 15/0233

FOREIGN PATENT DOCUMENTS

JP 11-249528 9/1999
JP 2010-266570 11/2010

* cited by examiner

*Primary Examiner* — Sandra Brase
(74) *Attorney, Agent, or Firm* — Amin, Turocy & Watson, LLP

(57) ABSTRACT

An image forming apparatus includes a housing, a charging roller, an image forming section, a bearing member, a holding member, an urging member, a fixing section, and an unfixing section. A cylindrical image bearing body is attached to the housing. The charging roller comes into contact with the surface of the image bearing body and charges the surface. The image forming section forms an image on the charged surface. The holding member holds the bearing member. The urging member urges the bearing member in a first direction. The fixing section fixes the bearing member in a first position. The unfixing section separates the charging roller from the surface of the image bearing body and positions the holding member in the housing, unfixes the bearing member, moves the bearing member to a second position, and brings the charging roller into contact with the surface of the image bearing body.

20 Claims, 13 Drawing Sheets

IMAGE FORMING APPARATUS

FIELD

Embodiments described herein relate generally to an image forming apparatus such as a copying machine or a printer.

BACKGROUND

For example, an image forming apparatus such as a copying machine or a printer installed in a workplace includes a photoconductive drum, a charging device, an exposing device, a developing device, a transfer device, and a fixing device. The charging device uniformly charges the surface of the photoconductive drum. The exposing device exposes and scans the charged surface of the photoconductive drum and forms an electrostatic latent image. The developing device supplies a developer to the electrostatic latent image and develops the electrostatic latent image. The transfer device transfers a developer image onto paper. The fixing device heats and pressurizes the developer image transferred on the paper and fixes the developer image on the paper.

As the charging device, there are a charging device of a scorotron charging type that charges the surface of a photoconductive drum with electric discharge and a charging device of a roller charging type that brings a charging roller into contact with the surface of a photoconductive drum and charges the surface of the photoconductive drum. In the roller charging type, in order to prevent the charging roller from being rubbed against the photoconductive drum if the charging roller is brought into contact with the photoconductive drum, for example, the charging roller is swung centering on one end side of the charging roller and pressed against the photoconductive drum. In this case, it is necessary to, in a state in which the other end side of the charging roller is brought close to the photoconductive drum, fix the charging roller with, for example, screws such that the charging roller pressed against the photoconductive drum does not separate from the photoconductive drum with reaction.

Therefore, if the roller charging type is adopted, it is necessary to carefully attach the charging roller not to rub the charging roller against the photoconductive drum. For example, screws for preventing the charging roller from separating from the photoconductive drum are necessary. Attachment work for the charging roller requires skill and time.

DETAILED DESCRIPTION

An image forming apparatus according to an embodiment includes a housing, a charging roller, an image forming section, a bearing member, a holding member, an urging member, a fixing section, and an unfixing section. A cylindrical image bearing body is rotatably attached to the housing. The charging roller comes into contact with a surface of the image bearing body and charges the surface to predetermined potential. The image forming section forms an image on the charged surface of the image bearing body. The bearing member rotatably supports a rotating shaft of the charging roller. The holding member holds the bearing member in a state in which the charging roller is movable in a first direction orthogonal to the rotating shaft. The urging member urges the bearing member the first direction with respect to the holding member. The fixing section fixes the bearing member in a first position on an upstream side in the first direction with respect to the holding member. In a state in which the bearing member is fixed in the first position with respect to the holding member by the fixing section, the unfixing section separates the charging roller from the surface of the image bearing body to be opposed to the surface and positions the holding member in the housing and, thereafter, unfixes the bearing member fixed by the fixing section with an operation for sliding the holding member in a second direction parallel to the rotating shaft, moves the bearing member to a second position on a downstream side in the first direction with an urging force of the urging member, and brings the charging roller into contact with the surface of the image bearing body.

An embodiment is explained below with reference to the drawings. In the figures, if an image forming apparatus 100 is viewed from the front side (the paper surface near side of FIG. 1), a vertically upward direction is indicated by an arrow Z, a direction from the right to the left in the horizontal direction is indicated by an arrow Y, and a direction from the rear side to the front side of the image forming apparatus 100 orthogonal to the arrow Z and the arrow Y is indicated by an arrow X. The image forming apparatus 100 is a so-called multifunction peripheral having a print function, a copy function, a scan function, and the like.

Figure 1:
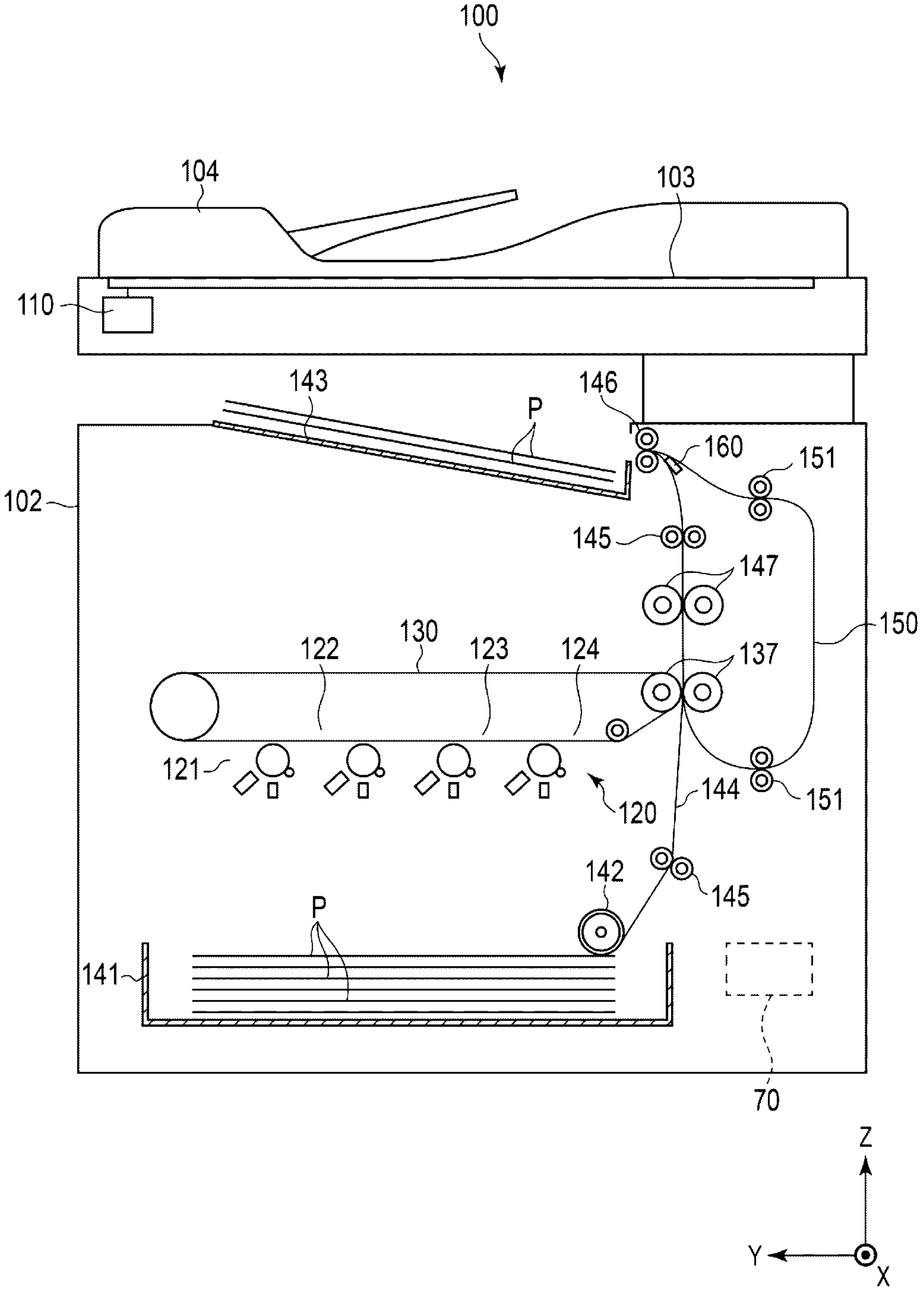
FIG. 1 is a schematic diagram illustrating an example of an image forming apparatus.

As illustrated in FIG. 1, the image forming apparatus 100 includes a housing 102. A transparent document table glass 103 on which an original document is set is present on the upper surface of the housing 102. An automatic document feeder (ADF) 104 is present on the document table glass 103. The ADF 104 is capable of opening and closing the document table glass 103. The ADF 104 functions as a document cover that presses the original document placed on the document table glass 103 and has a function of feeding the original document through the document table glass 103.

A document reading device 110 is present below the document table glass 103. The document reading device 110 is movable in a sub-scanning direction (the left-right direction illustrated in FIG. 1) along the document table glass 103 by a not-illustrated driving mechanism. The document reading device 110 extends in a main scanning direction orthogonal to the paper surface in FIG. 1 and causes a not-illustrated image sensor to form an erected image of the original document. The document reading device 110 photoelectrically converts reflected light from the original document received by the image sensor and outputs the reflected light as an image signal.

The image forming apparatus 100 includes an image forming section 120 substantially in the center in the housing 102. The image forming section 120 includes a yellow unit 121, a magenta unit 122, a cyan unit 123, and a black unit 124 in a traveling direction of an intermediate transfer belt 130. Since the color units 121, 122, 123, and 124 of the image forming section 120 have substantially the same structure, the black unit 124 is representatively explained here. Detailed explanation about the other color units 121, 122, and 123 is omitted.

Figure 2:
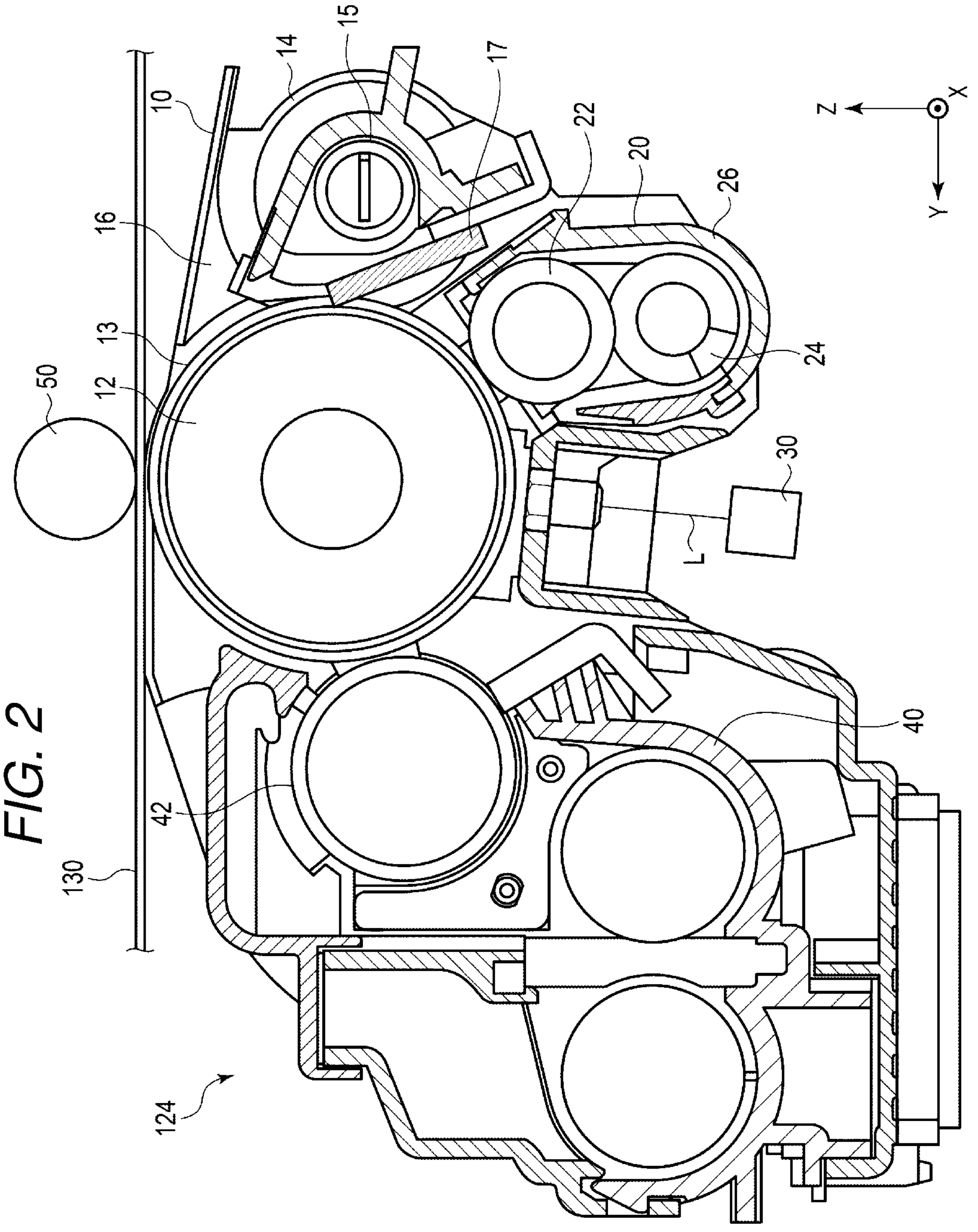
FIG. 2 is a schematic diagram illustrating a black unit of the image forming apparatus illustrated in FIG. 1.

FIG. 2 is a schematic diagram illustrating the black unit 124. The black unit 124 includes a drum unit 10, a charging unit 20, an exposing device 30, and a developing unit 40. Reference numeral 50 denotes a primary transfer roller.

The drum 10 includes a cylindrical unit photoconductive drum 12 (an image bearing body), a drum cleaner 14, and a housing 16. The housing 16 rotatably supports a rotating shaft of the photoconductive drum 12 and a rotating shaft of an auger 15 of the drum cleaner 14. The drum cleaner 14 includes a blade 17 that scrapes off a developer, paper powder, and the like remaining on a surface 13 of the photoconductive drum 12. The auger 15 rotates to thereby convey the developer, the paper powder, and the like scraped off by the blade 17 in the axial direction and stores the developer, the paper powder, and the like in a not-illustrated waste toner box. The rotating shaft of the photoconductive drum 12 and the rotating shaft of the auger 15 are substantially parallel to the arrow X.

The charging unit 20 includes a charging roller 22, a cleaning roller 24, and a case 26. The case 26 rotatably supports a rotating shaft 220 of the charging roller 22 and a rotating shaft 240 of the cleaning roller 24. In this state, the rotating shaft 220 of the charging roller 22 and the rotating shaft 240 of the cleaning roller 24 are substantially parallel. The cleaning roller 24 comes into contact with the surface of the charging roller 22.

The charging unit 20 is attached to the drum unit 10 by fixing both the ends in the axial direction of the case 26 to the housing 16 of the drum unit 10. In a state in which the charging unit 20 is attached to the drum unit 10 (a state illustrated in FIG. 2), the surface of the charging roller 22 comes into contact with the surface 13 of the photoconductive drum 12. The charging roller 22 rotates following the photoconductive drum 12 and charges the surface 13 of the photoconductive drum 12 to predetermined potential. The cleaning roller 24 rotates following the charging roller 22 and cleans the surface of the charging roller 22.

The exposing device 30 irradiates the surface 13 of the photoconductive drum 12 charged to the predetermined potential with exposure light L corresponding to the image signal, scans the surface 13 while involving rotation of the photoconductive drum 12, and forms an electrostatic latent image on the surface 13 of the photoconductive drum 12. The developing unit 40 supplies the developer to the surface 13 of the photoconductive drum 12 via a developing roller 42, develops the electrostatic latent image, and forms a developer image on the surface 13 of the photoconductive drum 12. The primary transfer roller 50 transfers the developer image formed on the surface 13 of the photoconductive drum 12 onto the intermediate transfer belt 130. The exposing device 30 and the developing unit 40 function as an image forming section.

As illustrated in FIG. 1, a transfer roller pair 137 for transferring color developer images transferred to be superimposed on the surface of the intermediate transfer belt 130 onto paper P is present on a downstream side of the black unit 124 in the traveling direction of the intermediate transfer belt 130. One transfer roller is present on the inner side of the intermediate transfer belt 130. The intermediate transfer belt 130 is stretched around one transfer roller. The other transfer roller is opposed to the one transfer roller across the intermediate transfer belt 130.

A paper feeding cassette 141 in which a plurality of pieces of paper P of a predetermined size are stacked and stored is present near the lower end in the housing 102 of the image forming apparatus 100. The paper feeding cassette 141 can be, for example, drawn out and housed from the front surface of the housing 102. A pickup roller 142 that picks up the paper P at the uppermost end in a stacking direction among the pieces of paper P stored in the paper feeding cassette 141 is present at the illustrated upper right end of the paper feeding cassette 141. The pickup roller 142 brings the circumferential surface thereof into contact with the pieces of paper P and rotates to pick up the pieces of paper P one by one.

A paper discharge tray 143 is present in an upper part in the housing 102. The paper discharge tray 143 is present between the document table glass 103 and the image forming section 120 and discharges the paper P subjected to image formation into a body of the image forming apparatus 100. A conveyance path 144 for conveying the paper P picked up from the paper feeding cassette 141 in the longitudinal direction toward the paper discharge tray 143 is present between the pickup roller 142 and the paper discharge tray 143. The conveyance path 144 extends through a nip of the transfer roller pair 137 and includes a plurality of conveying roller pairs 145 and a not-illustrated conveyance guide. A paper discharge roller pair 146 for discharging the paper P to the paper discharge tray 143 is present at the terminal end of the conveyance path 144. The paper discharge roller pair 146 is capable of rotating in forward and backward directions.

A fixing roller pair 147 is present on the conveyance path 144 on the downstream side (the upper side in FIG. 1) of the transfer roller pair 137. The fixing roller pair 147 heats and pressurizes the paper P conveyed via the conveyance path 144 and fixes, on the surface of the paper P, the developer image transferred onto the surface of the paper P.

The image forming apparatus 100 includes a reverse conveyance path 150 for reversing the front and the rear of the paper P subjected to image formation on one surface thereof and feeding the paper P into the nip of the transfer roller pair 137. The reverse conveyance path 150 includes a plurality of conveying roller pairs 151 that holds the paper P and rotates to convey the paper P and a not-illustrated conveyance guide. A gate 160 that switches a conveyance destination of the paper P between the conveyance path 144 and the reverse conveyance path 150 is present on the upstream side of the paper discharge roller pair 146.

If forming an image on the paper P, the image forming apparatus 100 rotates the pickup roller 142 to pick up the paper P from the paper feeding cassette 141 and conveys the paper P toward the paper discharge tray 143 via the conveyance path 144 with the plurality of conveying roller pairs 145. At this time, the image forming apparatus 100 feeds, according to conveyance timing of the paper P, the color developer images transferred and formed on the surface of the intermediate transfer belt 130 into the nip of the transfer roller pair 137, applies a transfer voltage to the color developer images with the transfer roller pair 137, and transfers the color developer images onto the surface of the paper P.

The image forming apparatus 100 conveys, through the fixing roller pair 147, the paper P, on which the developer images are transferred, to heat and pressurize the paper P, melts the developer images and presses the developer images against the surface of the paper P, and fixes the developer images on the paper P. The image forming apparatus 100 discharges the paper P subjected to image formation in this way to the paper discharge tray 143 via the paper discharge roller pair 146.

At this time, if a duplex mode for performing image formation on the rear surface of the paper P as well is selected, the image forming apparatus 100 switches the gate 160 to the reverse conveyance path 150 at timing immediately before the trailing end in a discharging direction of the paper P halfway in being discharged toward the paper discharge tray 143 passes through a nip of the paper discharge roller pair 146, reverses the paper discharge roller pair 146, and performs a switchback conveyance of the paper P. Consequently, the image forming apparatus 100 directs the trailing end of the paper P to the reverse conveyance path 150, reverses the front and the rear of the paper P, and feeds the paper p into the nip of the transfer roller pair 137.

The image forming apparatus 100 forms, on the surface of the intermediate transfer belt 130, developer images based on image data formed on the rear surface of the paper P, causes the intermediate transfer belt 130 holding the color developer images to travel, and feeds the color developer images into the nip of the transfer roller pair 137. Further, the image forming apparatus 100 transfers the developer images onto the rear surface of the reversed paper P and fixes the developer images, and discharges the paper P to the paper discharge tray 143 via the paper discharge roller pair 146.

The image forming apparatus 100 includes a control section 70 that controls operations of the mechanisms explained above. The control section 70 includes a processor such as a CPU and a memory. The processor executes a program stored in the memory, whereby the control section 70 realizes various processing functions. The control section 70 controls the document reading device 110 to thereby acquire an image from an original document. The control section 70 controls the image forming section 120 to thereby form an image on the surface of the paper P. For example, the control section 70 inputs image data read by the document reading device 110 to the image forming section 120. The control section 70 controls operations of a plurality of conveying roller pairs 145 and 151 and conveys the paper P through the conveyance path 144 and the reverse conveyance path 150.

Figure 3:
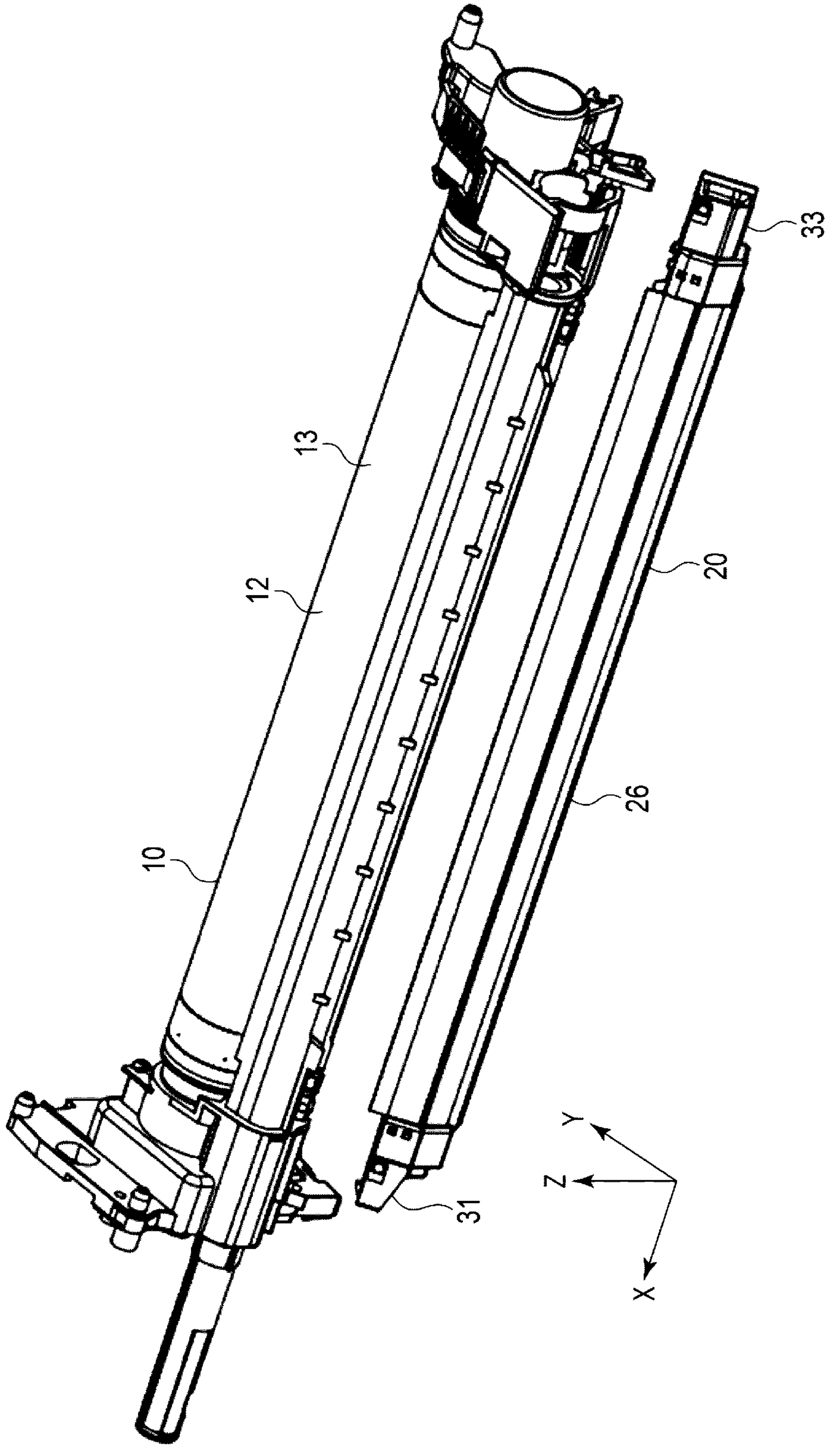
FIG. 3 is a perspective view illustrating a state in which a charging unit illustrated in FIG. 2 is separated from a drum unit.
Figure 4:
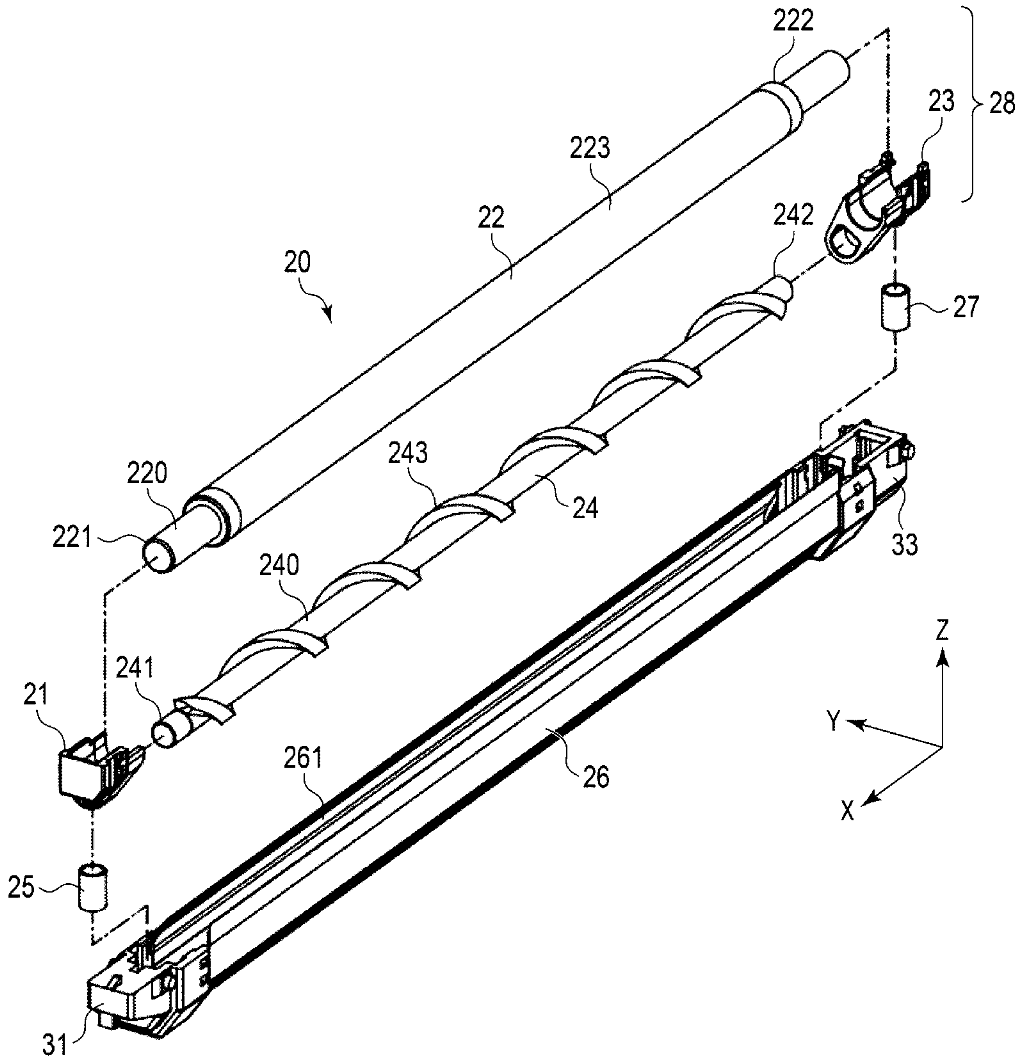
FIG. 4 is an exploded perspective view of the charging unit illustrated in FIG. 3.

FIG. 3 is a perspective view illustrating a state in which the charging unit 20 is separated from the drum unit 10. FIG. 4 is an exploded perspective view of the charging unit 20. The charging unit 20 includes two bearing members 21 and 23 and two coil springs 25 and 27 (urging members) besides the charging roller 22, the cleaning roller 24, and the case 26. The case 26 includes holding members 31 and 33 at both the ends in the longitudinal direction of the case 26.

The bearing member 21 on the front side rotatably supports an end portion 221 on the front side of the rotating shaft 220 of the charging roller 22 and an end portion 241 on the front side of the rotating shaft 240 of the cleaning roller 24. The bearing member 23 on the rear side rotatably supports an end portion 222 on the rear side of the rotating shaft 220 of the charging roller 22 and an end portion 242 on the rear side of the rotating shaft 240 of the cleaning roller 24. In a roller assembly 28 in which both the ends of the rotating shafts 220 and 240 of the two rollers 22 and 24 are rotatably supported by the two bearing members 21 and 23 in this way, the rotating shafts 220 and 240 of the two rollers 22 and 24 are parallel, a spiral vane 243 of the cleaning roller 24 is in contact with a surface 223 of the charging roller 22, and the cleaning roller 24 is capable of rotating following the charging roller 22.

The case 26 includes an opening section 261 on the upper surface thereof and houses the roller assembly 28 via the opening section 261. The two holding members 31 and 33 that receive and hold the two bearing members 21 and 23 of the roller assembly 28 are present at both the ends in the axial direction of the case 26. The holding members 31 and 33 respectively movably hold the bearing members 21 and 23 in an arrangement direction of the two rollers 22 and 24. The holding members 31 and 33 are a part of the case 26 and may be integrally formed as the case 26 or may be formed as separate bodies and combined.

The coil spring 25 on the front side is disposed between the bottom of the holding member 31 on the front side of the case 26 and the bearing member 21 on the front side. The coil spring 25 urges the bearing member 21 in a direction in which the bearing member 21 projects from the opening section 261 of the case 26. The coil sprig 27 on the rear side is disposed between the bottom of the holding member 33 on the rear side of the case 26 and the bearing member 23 on the rear side. The coil spring 27 urges the bearing member 23 in a direction in which the bearing member 23 projects from the opening section 261 of the case 26. The directions in which the coil springs 25 and 27 urge the bearing members 21 and 23 are a direction in which the rotating shaft 220 of the charging roller 22 and the rotating shaft 240 of the cleaning roller 24 are arranged. The direction from the cleaning roller 24 toward the charging roller 22 is a first direction.

That is, the holding members 31 and 33 respectively hold the bearing members 21 and 23 in a state in which the bearing members 21 and 23 are movable in the first direction orthogonal to the rotating shaft 220 of the charging roller 22. The coil springs 25 and 27 respectively urge the bearing members 21 and 23 in the first direction with respect to the holding members 31 and 33. The opening section 261 of the case 26 causes the outer circumferential surface of the charging roller 22 urged by the coil springs 25 and 27 to project from the case 26.

As illustrated in FIG. 2, in a state in which the charging unit 20 is attached to the drum unit 10, the charging roller 22 is not in contact with the photoconductive drum 12 from right under the photoconductive drum 12 in the arrow Z direction and is in contact with the photoconductive drum 12 in a direction slightly inclined with respect to the arrow Z direction. However, the charging roller 22 may be brought into contact with the photoconductive drum 12 from right under the photoconductive drum 12 in the arrow Z direction. If the charging roller 22 is brought into contact with the photoconductive drum 12 in a direction nonparallel to the arrow Z direction, the first direction is also nonparallel to the arrow Z direction. However, to facilitate understanding of the explanation, it is assumed that the first direction is a direction parallel to the arrow Z direction.

Figure 5:
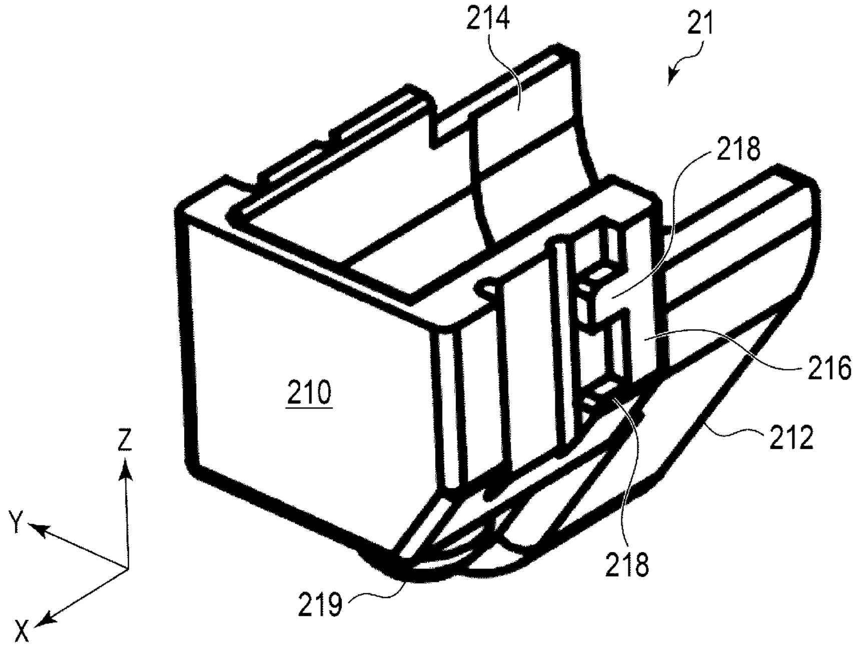
FIG. 5 is an enlarged perspective view illustrating a bearing member on the front side of the charging unit illustrated in FIG. 4.

As illustrated in FIG. 5, the bearing member 21 on the front side includes an insertion hole section 212 through which the end portion 241 on the front side of the rotating shaft 240 of the cleaning roller 24 is rotatably inserted and a fitting recess 214 in which the end portion 221 on the front side of the rotating shaft 220 of the charging roller 22 is rotatably fit. The bearing member 21 includes, on the outer side of the fitting recess 214, two rails 216 (only one is illustrated) extended in the first direction. The rails 216 include two engaging projecting sections 218 projecting in the arrow X direction from the end faces on the front side of the rails 216. The two engaging projecting sections 218 are respectively extended in a second direction (that is, a direction of the arrow X) parallel to the rotating shaft 220 of the charging roller 22 and orthogonal to the first direction and are separated from each other in the first direction. Further, the bearing member 21 includes a protrusion section 219 projecting in the opposite direction of the arrow Z direction to which one end of the coil spring 25 on the front side is attached.

Figure 6:
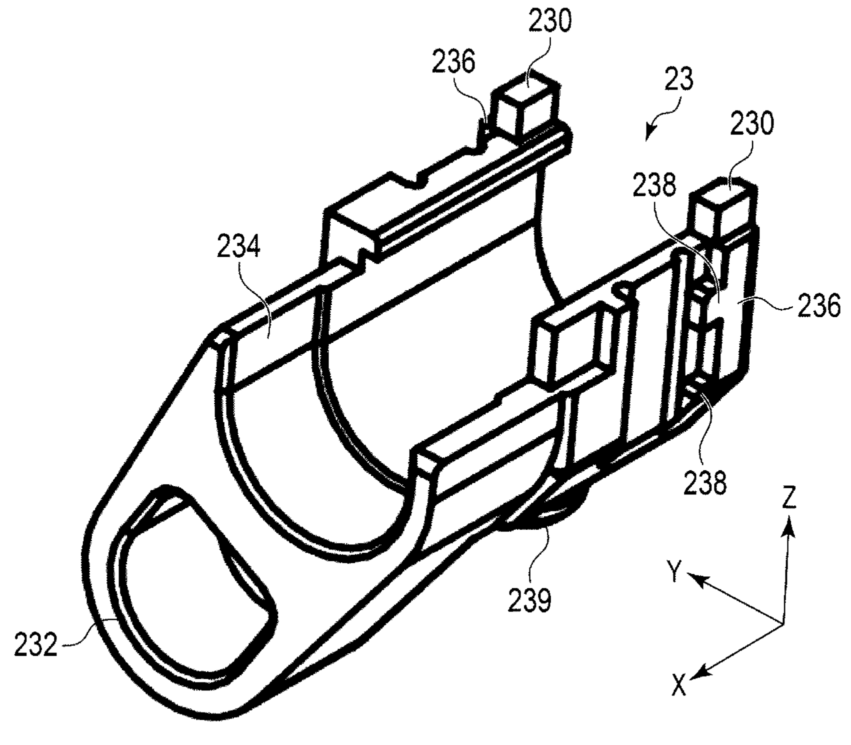
FIG. 6 is an enlarged perspective view illustrating a bearing member on the rear side of the charging unit illustrated in FIG. 4.

As illustrated in FIG. 6, the bearing member 23 on the rear side includes an insertion hole section 232 through which the end portion 242 on the rear side of the rotating shaft 240 of the cleaning roller 24 is rotatably inserted and a fitting recess 234 in which the end portion 222 on the rear side of the rotating shaft 220 of the charging roller 22 is rotatably fit. The bearing member 23 includes, on the outer side of the fitting recess 234, two rails 236 extended in the first direction. The rails 236 include two engaging projecting sections 238 projecting in the arrow X direction from the end faces on the front side of the rails 236. The two engaging projecting sections 238 are respectively extended in the second direction and separated from each other in the first direction. Further, the bearing member 23 includes a protrusion section 239 projecting in the opposite direction of the arrow Z direction to which one end of the coil spring 27 on the rear side is attached.

Figure 7:
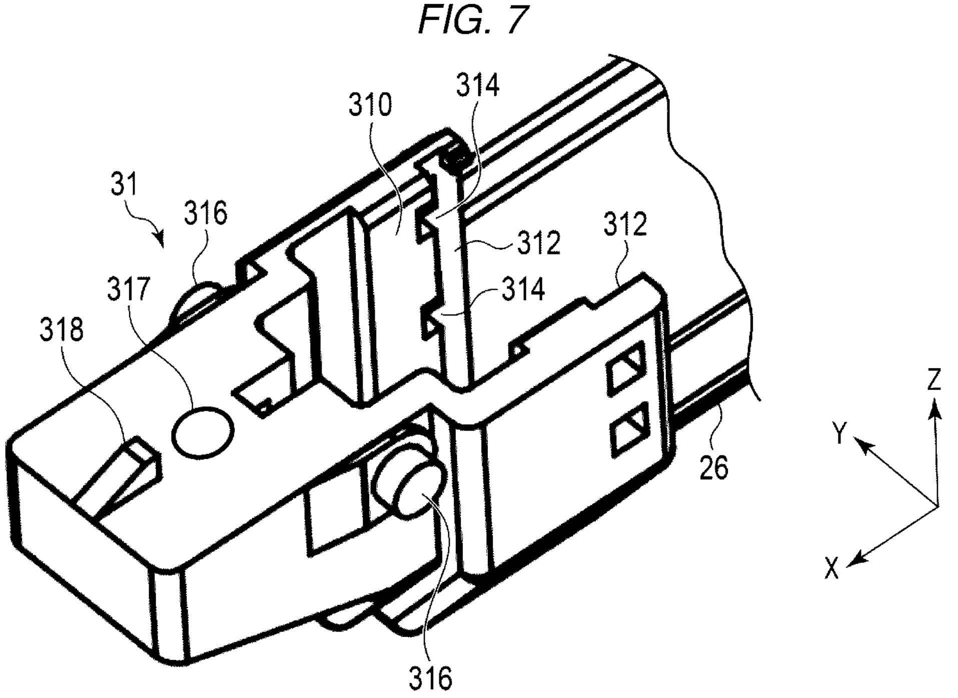
FIG. 7 is an enlarged perspective view illustrating a holding member on the front side of a case that holds the bearing member illustrated in FIG. 5.

As illustrated in FIG. 7, the holding member 31 provided on the front side of the case 26 includes, on the upper surface side thereof, a recess 310 for receiving the bearing member 21 on the front side explained above. The recess 310 includes, on the inner surface thereof, two groove sections 312 extending in the first direction for receiving the two rails 216 of the bearing member 21. Two engaging grooves 314 separated from each other in the first direction and extending in the second direction are present on the front side of the groove sections 312. The two engaging projecting sections 218 of the bearing member 21 engage in the two engaging grooves 314. The engaging projecting sections 218 may be provided on the holding member 31 side and the engaging grooves 314 may be provided on the bearing member 21 side.

The holding member 31 includes, on the bottom inner surface of the recess 310, a substantially columnar protrusion section 319 (FIGS. 9 and 10) projecting in the arrow Z direction to which the other end of the coil spring 25 on the front side is attached. The holding member 31 includes, on the outer side surface thereof, substantially columnar two engaging protrusions 316 engaged in engaging grooves 162 (FIG. 15) explained below of the housing 16 of the drum unit 10. The two engaging protrusions 316 are coaxially disposed. One of the two engaging protrusions 316 projects in the arrow Y direction from the outer side surface of the holding member 31. The other projects in the opposite direction of the arrow Y from the outer side surface on the opposite side of the holding member 31.

The holding member 31 includes an engaging claw 318 that engages in an engaging recess 164 (FIG. 15) explained below of the housing 16 of the drum unit 10 in order to prevent the charging unit 20 from slipping off in the opposite direction of the arrow X in a state in which the charging unit 20 is attached to the drum unit 10 (the state illustrated in FIG. 2). The engaging recess 164 of the drum unit 10 and the engaging claw 318 of the charging unit 20 function as a movement preventing section that prevents the holding member 31 from moving in the opposite direction of the second direction. The engaging claw 318 may be provided on the drum unit 10 side and the engaging recess 164 may be provided on the charging unit 20 side.

Further, the holding member 31 includes an insertion hole 317 for inserting a screw 161 (FIG. 17) that screws in a screw hole 168 (FIG. 15) explained below of the housing 16 of the drum unit 10. The screw 161 is an example of a fixing member for fixing the holding member 31 to the housing 16 after the charging unit 20 is attached to the drum unit 10.

Figure 8:
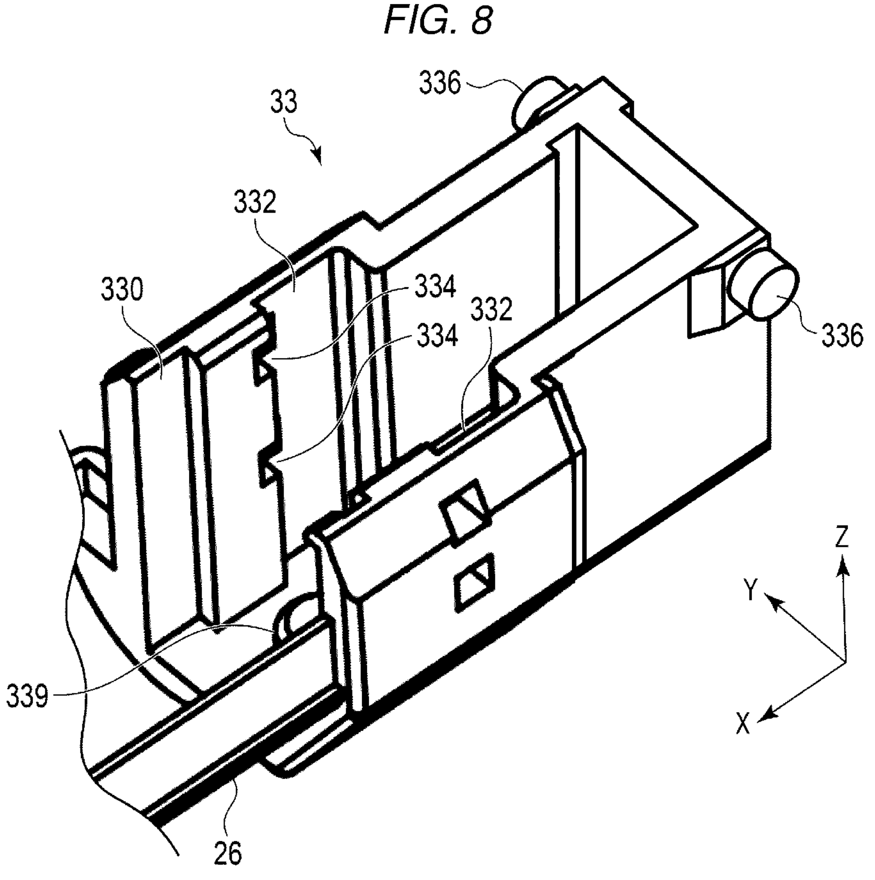
FIG. 8 is an enlarged perspective view illustrating a holding member on the rear side of the case that holds the bearing member illustrated in FIG. 6.

As illustrated in FIG. 8, the holding member 33 provided on the rear side of the case 26 includes, on the upper surface side thereof, a recess 330 that receives the bearing member 23 on the rear side explained above. The recess 330 includes two groove sections 332 extending in the first direction that receive the two rails 236 of the bearing member 23. Two engaging grooves 334 separated from each other in the first direction and extending in the second direction are present on the front side of the groove sections 332. The two engaging projecting sections 238 of the bearing member 23 engage in the two engaging grooves 334. The engaging projecting sections 238 may be provided on the holding member 33 side and the engaging grooves 334 may be provided on the bearing member 23 side.

The holding member 33 includes, on the bottom inner surface of the recess 330, a substantially columnar protrusion section 339 projecting in the arrow Z direction to which the other end of the coil spring 27 on the rear side is attached. The holding member 33 includes, on the outer side surface thereof, substantially columnar two engaging protrusions 336 engaged in engaging grooves 163 (FIG. 16) explained below of the housing 16 of the drum unit 10. The two engaging protrusions 336 are coaxially disposed. One of the two engaging protrusions 336 projects in the arrow Y direction from the outer side surface of the holding member 33. The other projects in the opposite direction of the arrow Y from the outer side surface on the opposite side of the holding member 33.

If the charging unit 20 explained above is assembled, first, the end portion 221 on the front side of the rotating shaft 220 of the charging roller 22 and the end portion 241 on the front side of the rotating shaft 240 of the cleaning roller 24 are supported by the bearing member 21 on the front side and the end portion 222 on the rear side of the rotating shaft 220 of the charging roller 22 and the end portion 242 on the rear side of the rotating shaft 240 of the cleaning roller 24 are supported by the bearing member 23 on the rear side to assemble the roller assembly 28. The roller assembly 28 is housed in the case 26 via the opening section 261.

Figure 9:
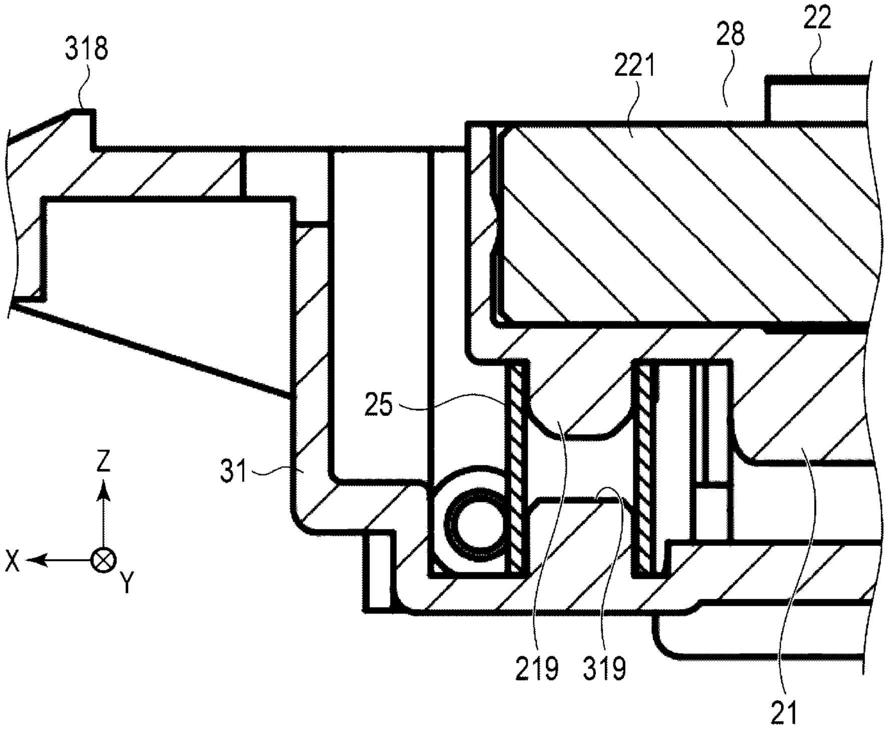
FIG. 9 is a sectional view illustrating a state in which the bearing member illustrated in FIG. 5 is disposed in a recess of the holding member illustrated in FIG. 7 via coil springs illustrated in FIG. 4.

At this time, as illustrated in FIG. 9, one end of the coil spring 25 on the front side is attached to the protrusion section 219 of the bearing member 21 on the front side and the other end of the coil spring 25 is attached to the protrusion section 319 of the holding member 31 on the front side to attach the coil spring 25 between the bearing member 21 and the holding member 31. At this time, one end of the coil spring 27 on the rear side is attached to the protrusion section 239 of the bearing member 23 on the rear side and the other end of the coil spring 27 is attached to the protrusion section 339 of the holding member 33 on the rear side to attach the coil spring 27 between the bearing member 23 and the holding member 33. A state of the coil spring 25 on the front side at the time when the roller assembly 28 is housed in the case 26 with the two coil springs 25 and 27 held between the roller assembly 28 and the case 26 is illustrated in FIG. 9. Although illustration and explanation are omitted here, the coil spring 27 on the rear side is in the same state.

As illustrated in FIG. 9, in a state in which the bearing member 21 is housed in the recess 310 of the holding member 31 with the coil spring 25 held between the bearing member 21 and the holding member 31 (a state before the bearing member 21 is fixed to the holding member 31), the protrusion section 219 of the bearing member 21 and the protrusion section 319 of the holding member 31 are coaxially opposed side by side in the arrow Z direction and the coil spring 25 straightly supports a load in the arrow Z direction. In this state, the coil spring 25 urges the bearing member 21 in a direction away from the bottom of the recess 310 of the holding member 31, the coil spring 27 urges the bearing member 23 in a direction away from the bottom of the recess 330 of the holding member 33, and the outer circumferential surface of the charging roller 22 projects from the opening section 261 of the case 26.

In the state illustrated in FIG. 9, after the bearing member 21 is pushed toward the bottom of the recess 310 of the holding member 31 in the opposite direction of the first direction against an urging force of the coil spring 25, if the bearing member 21 is slightly slid in the second direction with respect to the holding member 31, the four engaging projecting sections 218 of the bearing member 21 engage in the four engaging grooves 314 of the holding member 31. At the same time, the four engaging projecting sections 238 of the bearing member 23 on the rear side engage in the four engaging grooves 334 of the holding member 33. That is, the engaging projecting sections 218 and 238 of the two bearing members 21 and 23 and the engaging grooves 314 and 334 of the two holding members 31 and 33 function as fixing sections that fix the bearing members 21 and 23 to the holding members 31 and 33. A state of the coil spring 25 on the front side at the time when the bearing members 21 and 23 are fixed to the holding members 31 and 33 is illustrated in FIG. 10.

Figure 11:
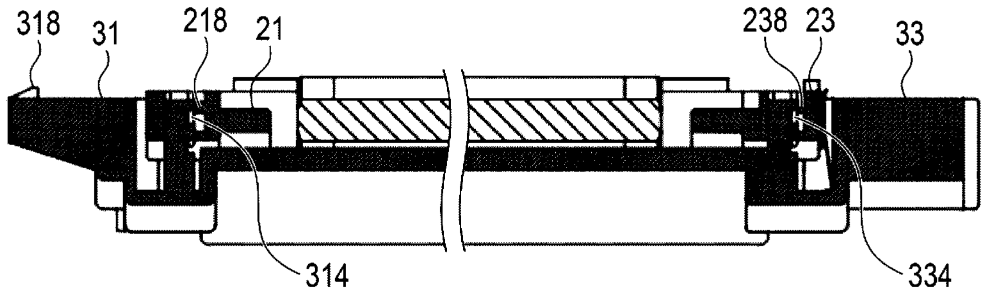
FIG. 11 is a sectional view illustrating a positional relation between engaging protrusions and engaging grooves in a state in which a charging roller is housed in a case of the charging unit illustrated in FIG. 3.
Figure 12:
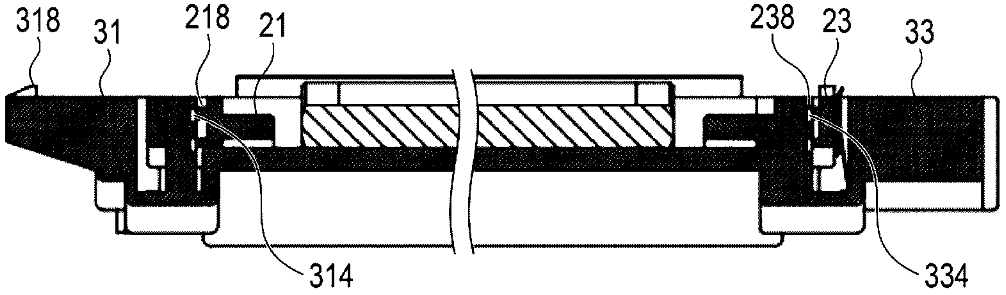
FIG. 12 is a sectional view illustrating a positional relation between the engaging protrusion and the engaging groove in a state in which the charging roller is pushed into the case illustrated in FIG. 11.
Figure 13:
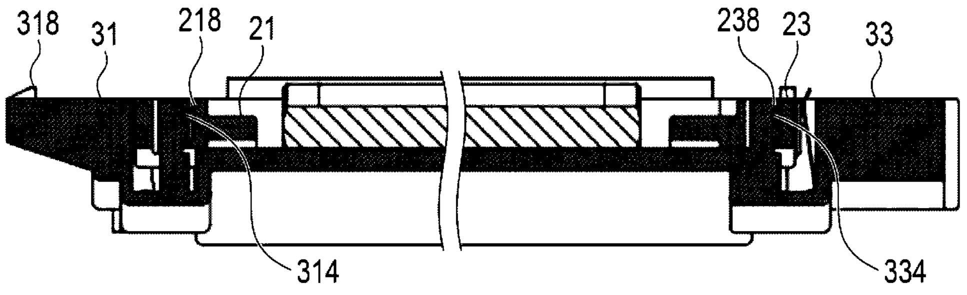
FIG. 13 is a sectional view illustrating a positional relation between the engaging protrusions and the engaging grooves in a state in which the charging roller illustrated in FIG. 12 is fixed to the case.

FIG. 11 illustrates a positional relation between the engaging projecting sections 218 and 238 and the engaging grooves 314 and 334 in a state in which the bearing members 21 and 23 are housed in the recesses 310 and 330 of the holding members 31 and 33 and the roller assembly 28 is housed in the case 26. FIG. 12 illustrates a positional relation between the engaging projecting sections 218 and 238 and the engaging grooves 314 and 334 in a state in which the roller assembly 28 is pushed in toward the bottom of the case 26 in the opposite direction of the first direction. FIG. 13 illustrates a positional relation between the engaging projecting sections 218 and 238 and the engaging grooves 314 and 334 in a state in which the roller assembly 28 is slightly slid in the arrow X direction with respect to the case 26 from the position illustrated in FIG. 12. The engaging projecting sections 218 and 238 and the engaging grooves 314 and 334 are engaged by moving the roller assembly 28 from the state illustrated in FIG. 11 to the state illustrated in FIG. 13 through the state illustrated in FIG. 12 with respect to the case 26.

Figure 10:
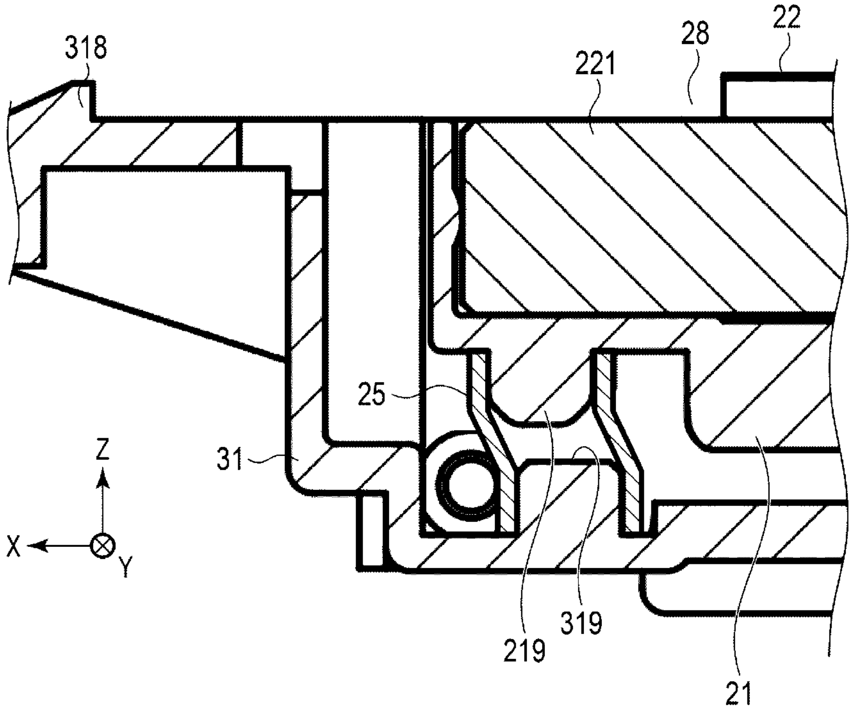
FIG. 10 is a sectional view illustrating a state in which the bearing member illustrated in FIG. 9 is fixed to the holding member.

If the bearing members 21 and 23 are fixed to the holding members 31 and 33 as explained above, the coil spring 25 is deformed into a state illustrated in FIG. 10. As illustrated in FIG. 10, a position where the bearing member 21 is fixed to the holding member 31 is the first position. If the bearing member 21 is unfixed from the holding member 31, the bearing member 21 is slid in the opposite direction of the arrow X direction with respect to the holding member 31 to disengage the engaging projecting section 218 from the engaging groove 314. If the engaging projecting section 218 is disengaged from the engaging groove 314, the coil spring 25 returns from a shape illustrated in FIG. 10 to a shape illustrated in FIG. 9 with a restoration force and pushes up the bearing member 21 in the arrow Z direction with respect to the holding member 31. A position illustrated in FIG. 9 where the bearing member 21 is separated from the holding member 31 by the coil spring 25 is the second position.

A configuration for unfixing the bearing member 21 (23) from the holding member 31 (33) and a configuration for attaching the charging unit 20 to the drum unit 10 are explained with reference to FIGS. 14 to 18.

Figure 14:
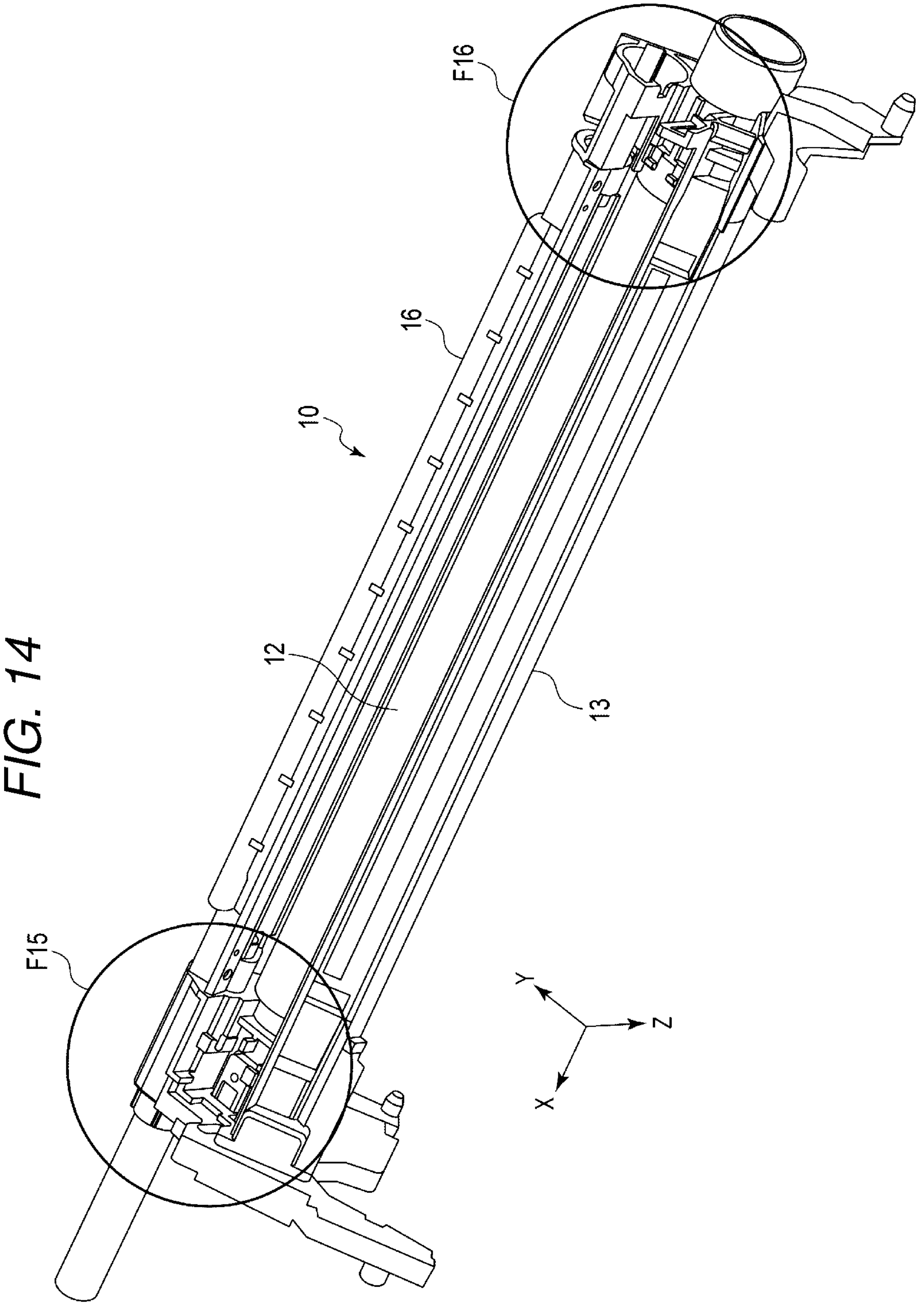
FIG. 14 is a perspective view of the drum unit illustrated in FIG. 3 viewed from the charging unit side.
Figure 15:
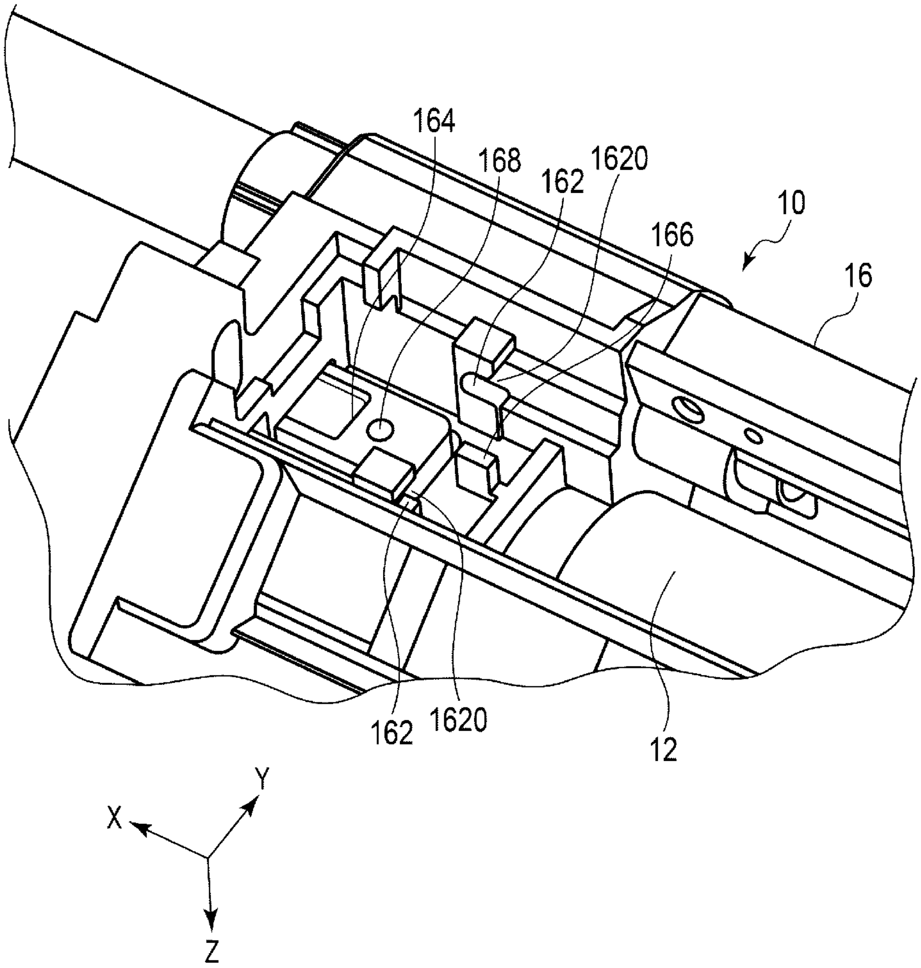
FIG. 15 is an enlarged perspective view illustrating a region F15 illustrated in FIG. 14.
Figure 16:
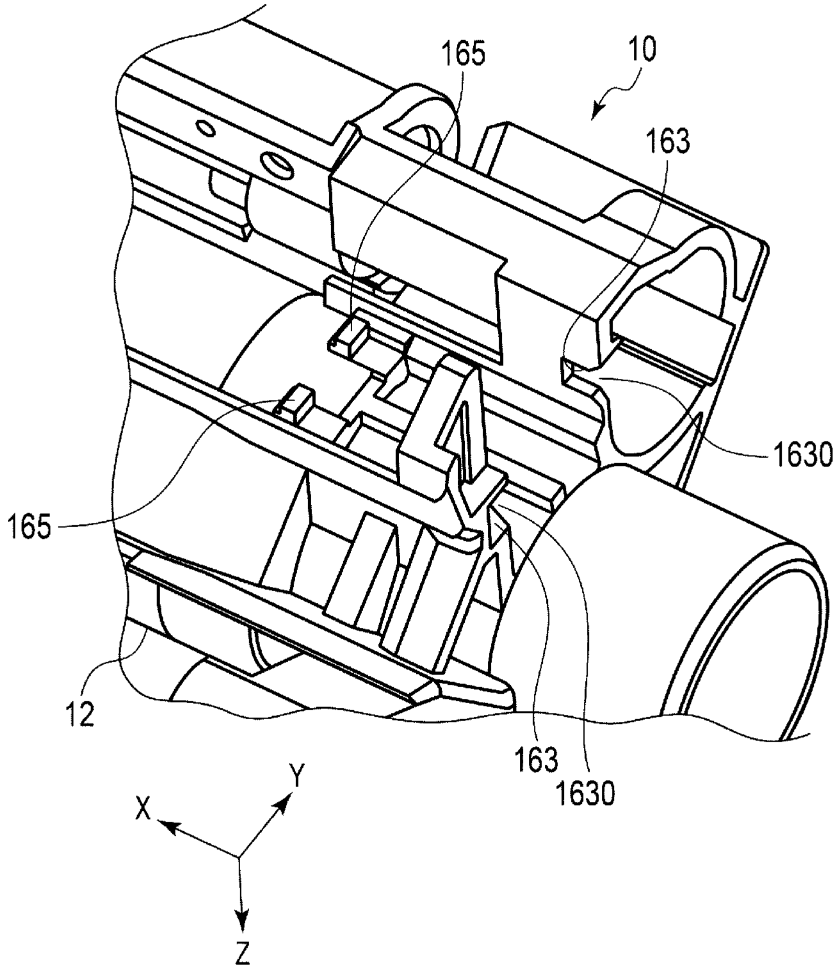
FIG. 16 is an enlarged perspective view illustrating a region F16 illustrated in FIG. 14.
Figure 17:
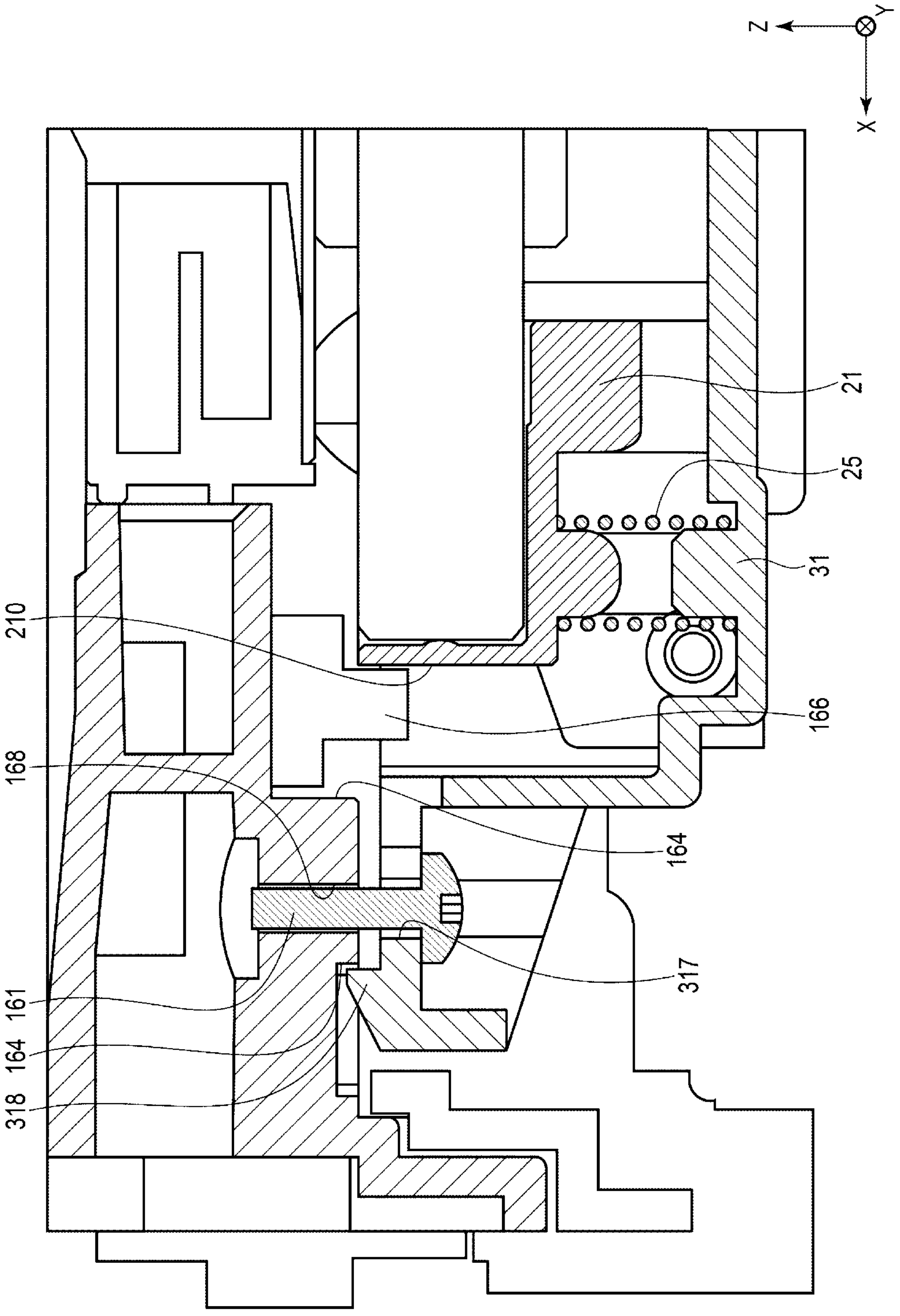
FIG. 17 is a sectional view illustrating a slip-off preventing structure for preventing the charging unit illustrated in FIG. 3 from slipping off from the drum unit.
Figure 18:
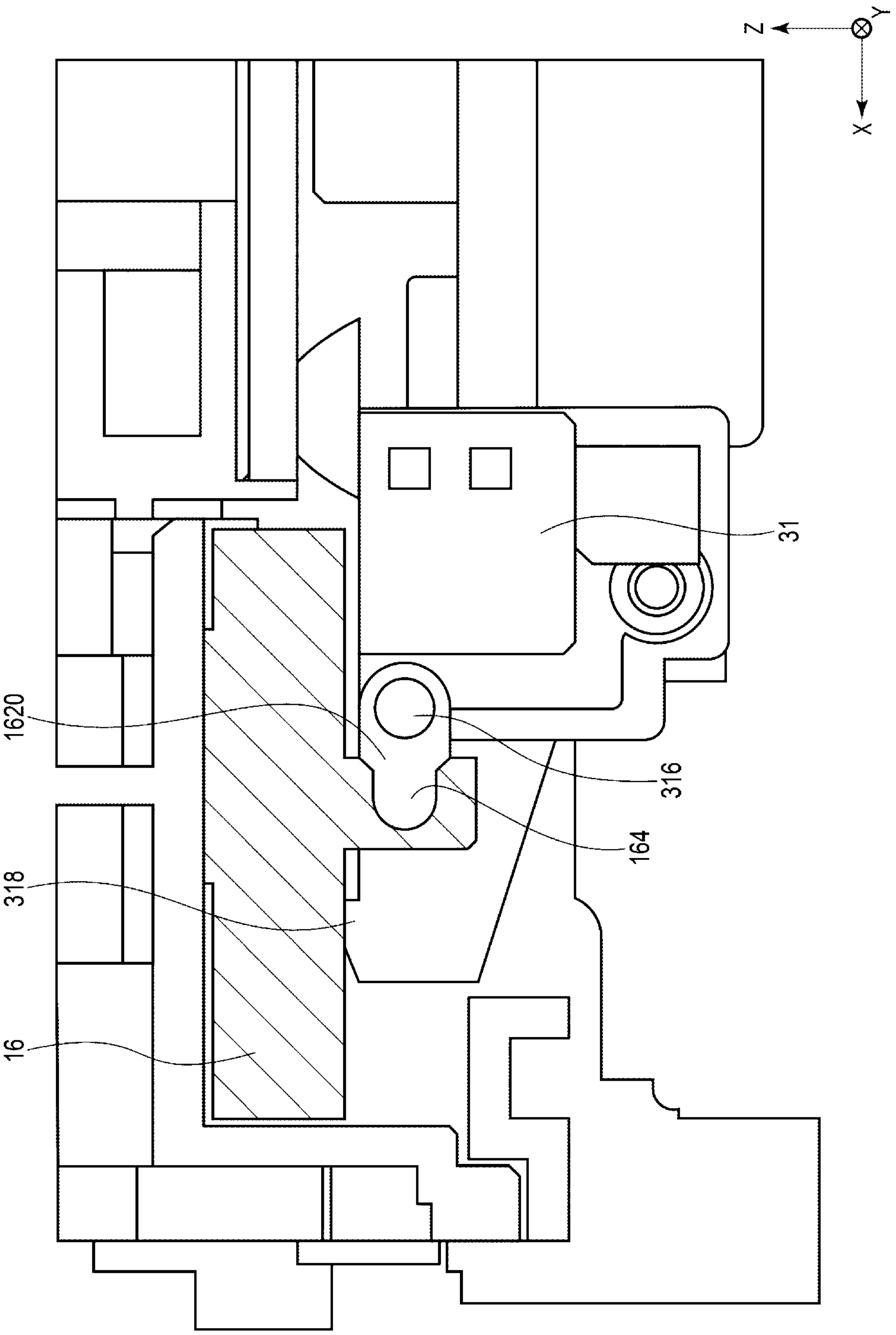
FIG. 18 is a sectional view illustrating a state in which the charging unit illustrated in FIG. 3 is positioned with respect to the drum unit.

FIG. 14 is a perspective view of the drum unit 10 viewed from the charging unit 20 side not illustrated herein. FIG. 15 is an enlarged perspective view illustrating a region F15 on the front side of FIG. 14. FIG. 16 is an enlarged perspective view illustrating a region F16 on the rear side of FIG. 14. FIG. 17 is a sectional view illustrating a slip-off preventing structure for preventing the charging unit 20 from slipping off from the drum unit 10. FIG. 18 is a sectional view illustrating a state in which the holding member 31 on the front side of the charging unit 20 is brought close to the housing 16 of the drum unit 10 and positioned.

As illustrated in FIG. 15, the housing 16 of the drum unit 10 includes two engaging grooves 162, the engaging recess 164, a locking claw 166, and the screw hole 168 in a position opposed to the holding member 31 on the front side of the charging unit 20. The two engaging grooves 162 engage the two engaging protrusions 316 of the holding member 31 on the front side of the charging unit 20. The engaging grooves 162 include, on the upstream side in the arrow X direction, openings 1620 (only one is illustrated) for receiving the engaging protrusions 316 and extend in the second direction. The engaging recess 164 engages the engaging claw 318 of the holding member 31 on the front side of the charging unit 20.

If the charging unit 20 is slid in the second direction with respect to the drum unit 10 to be attached to the drum unit 10, the locking claw 166 collides with and locks an end face 210 (FIGS. 5 and 17) on the front side of the bearing member 21 on the front side. The locking claw 166 is an example of a locking member. After the charging unit 20 is attached to the drum unit 10, the screw 161 (FIG. 17) for fixing the holding member 31 of the charging unit 20 to the housing 16 of the drum unit 10 is screwed in the screw hole 168.

As illustrated in FIG. 16, the housing 16 includes two engaging grooves 163 and two locking claws 165 in a position opposed to the holding member 33 on the rear side of the charging unit 20. The two engaging grooves 163 engage the two engaging protrusions 336 of the holding member 33 on the rear side of the charging unit 20. The engaging grooves 163 include, on the upstream side in the arrow X direction, openings 1630 for receiving the engaging protrusions 336 and extend in the second direction. If the charging unit 20 is slid in the second direction with respect to the drum unit 10 to be attached to the drum unit 10, the two locking claws 165 come into contact with and lock two locking claws 230 (FIG. 6) of the bearing member 23 on the rear side.

Subsequently, an operation for assembling the charging unit 20 and attaching the charging unit 20 to the drum unit 10 is explained.

If the charging unit 20 is assembled, first, the roller assembly 28 is housed in the case 26 via the opening section 261. This state is illustrated in FIGS. 9 and 11. Thereafter, the roller assembly 28 is pushed in toward the bottom of the case 26 in the opposite direction of the first direction (this state is illustrated in FIG. 12), slid in the second direction with respect to the case 26, and fixed in the first position explained above. This state is illustrated in FIGS. 10 and 13.

If the charging unit 20 assembled as explained above is attached to the drum unit 10, the charging unit 20 in the state in which the roller assembly 28 is fixed in the first position is moved in the first direction and brought close to the drum unit 10 and, as illustrated in FIG. 18, a part of the case 26 of the charging unit 20 is brought into contact with a part of the housing 16 of the drum unit 10 and the charging unit 20 is positioned in the drum unit 10. According to the positioning, for example, the engaging claw 318 of the holding member 31 on the front side of the case 26 of the charging unit 20 comes into contact with the housing 16. In a state in which the charging unit 20 is positioned in the drum unit 10, the engaging protrusions 316 (336) of the holding member 31 (33) are opposed to the upstream side in the arrow X direction of the openings 1620 (1630) of the engaging grooves 162 (163) of the housing 16.

In a state in which the charging unit 20 is positioned in the drum unit 10 in this way, since the roller assembly 28 is fixed in the first position and the charging roller 22 is pushed into the case 26, even if the charging unit 20 is brought close to the drum unit 10, the charging roller 22 does not come into contact with the photoconductive drum 12 of the drum unit 10. In this state, the end face 210 of the bearing member 21 on the front side of the roller assembly 28 of the charging unit 20 is separated from the locking claw 166 of the housing 16 of the drum unit 10 in the arrow X direction and the two locking claws 230 of the bearing member 23 on the rear side are separated from the two locking claws 165 of the housing 16 in the arrow X direction.

In this state, the charging unit 20 is slightly slid in the arrow X direction with respect to the drum unit 10, the two engaging protrusions 316 of the holding member 31 on the front side of the charging unit 20 are engaged in the two engaging grooves 162 on the front side of the drum unit 10, and the two engaging protrusions 336 of the holding member 33 on the rear side of the charging unit 20 are engaged in the two engaging grooves 163 on the rear side of the drum unit 10. While the charging unit 20 is slid in the second direction with respect to the drum unit 10, since the roller assembly 28 is fixed in the first position, a deficiency caused by the charging roller 22 coming into contact with and rubbing against the photoconductive drum 12 is not caused.

If the charging unit 20 is slid to the most downstream side in the second direction with respect to the drum unit 10, as illustrated in FIG. 17, the engaging claw 318 of the holding member 31 on the front side of the charging unit 20 engages in the engaging recess 164 of the housing 16 of the drum unit 10. In this state, the charging unit 20 can be prevented from slipping off from the drum unit 10 in the opposite direction of the arrow X direction. After the engaging claw 318 is engaged in the engaging recess 164 as illustrated in FIG. 17, the screw 161 is screwed in the screw hole 168 of the housing 16 through the insertion hole 317 of the holding member 31 and the holding member 31 is fastened and fixed to the housing 16.

Before the charging unit 20 is slid in the second direction with respect to the drum unit 10 and the engaging claw 318 engages in the engaging recess 164, the end face 210 on the front side of the bearing member 21 on the front side of the charging unit 20 comes into contact with the locking claw 166 of the drum unit 10 and the two locking claws 230 of the bearing member 23 on the rear side of the charging unit 20 come into contact with the two locking claws 165 of the drum unit 10 and the movement of the roller assembly 28 in the second direction stops. If the roller assembly 28 stops while the charging unit 20 is slid in the second direction in this way, only the case 26 including the holding members 31 and 33 slides in the second direction.

Consequently, a slight gap is formed in the arrow X direction between the roller assembly 28 and the case 26. The engaging projecting sections 218 (238) of the bearing member 21 (23) of the roller assembly 28 are disengaged from the engaging grooves 314 (334) of the holding member 31 (33) of the charging unit 20. If the engaging projecting sections 218 (238) are disengaged, the roller assembly 28 projects in the first direction via the opening section 261 of the case 26 with the urging force of the coil springs 25 and 27.

According to the operation explained above, the outer circumferential surface of the charging roller 22 of the roller assembly 28 comes into contact with the surface 13 of the photoconductive drum 12 and the attachment of the charging unit 20 to the drum unit 10 is completed.

According to this embodiment, it is possible to complete the attachment of the charging unit 20 to the drum unit 10 by fixing the roller assembly 28 to the case 26 in advance, bringing the charging unit 20 close to the housing 16 of the drum unit 10 in the first direction and positioning the charging unit 20, and sliding the charging unit 20 slightly in the second direction with respect to the housing 16. Therefore, the charging roller 22 does not come into contact with and rub against the photoconductive drum 12 if being attached to the drum unit 10. Anybody can easily and surely attach the charging unit 20.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from spirit of the inventions. The accompanying claims and their equivalents are intended to cover such forms or modifications as would fall within the scope and spirit of the inventions.

What is claimed is:

1. An image forming apparatus, comprising:

a housing to which a cylindrical image bearing body is rotatably attached;

a charging roller configured to come into contact with a surface of the image bearing body and charge the surface to a predetermined potential;

an image forming section configured to form an image on a charged surface of the image bearing body;

a bearing member rotatably supporting a rotating shaft of the charging roller;

a holding member configured to hold the bearing member in a state in which the charging roller is movable in a first direction orthogonal to the rotating shaft;

an urging member configured to urge the bearing member in the first direction with respect to the holding member;

a fixing section configured to fix the bearing member in a first position on an upstream side in the first direction with respect to the holding member; and an unfixing section configured to, in a state in which the bearing member is fixed in the first position with respect to the holding member by the fixing section, separate the charging roller from the surface of the image bearing body so as to be opposed to the surface and position the holding member in the housing and, thereafter, unfix the bearing member fixed by the fixing section with an operation for sliding the holding member in a second direction parallel to the rotating shaft, move the bearing member to a second position on a downstream side in the first direction with an urging force of the urging member, and bring the charging roller into contact with the surface of the image bearing body.

2. The image forming apparatus according to claim 1, wherein the holding member is a part of a case including an opening section for projecting the charging roller toward the image bearing body in a state in which the charging roller is positioned in the housing, the case housing the bearing member via the urging member and housing the charging roller.

3. The image forming apparatus according to claim 2, wherein the bearing member rotatably supports a rotating shaft of a cleaning roller that cleans the charging roller, and the case houses the cleaning roller.

4. The image forming apparatus according to claim 1, wherein the urging member is a coil spring that changes to a straight shape parallel to the first direction in a state in which the bearing member is moved to the second position and is deformable into a shape nonparallel to the first direction if the bearing member is moved to the first position.

5. The image forming apparatus according to claim 1, wherein the fixing section includes an engaging projecting section extending to one of the bearing member and the holding member in the second direction and an engaging groove extending to another of the bearing member and the holding member in the second direction, the engaging projecting section at least partially fits in the engaging groove in a state in which the bearing member is fixed in the first position with respect to the holding member, and the engaging projecting section is disengaged from the engaging groove by sliding the holding member in the second direction with respect to the bearing member in a state in which the bearing member is fixed in the first position with respect to the holding member.

6. The image forming apparatus according to claim 1, further comprising a movement preventing section configured to prevent the holding member from moving in an opposite direction of the second direction in a state in which the holding member is slid in the second direction to unfix the bearing member fixed by the fixing section.

7. The image forming apparatus according to claim 6, wherein the movement preventing section includes an engaging claw provided in one of the housing and the holding member and an engaging recess provided in another of the housing and the holding member, the engaging recess engaging with the engaging claw according to an operation for sliding the holding member in the second direction.

8. The image forming apparatus according to claim 6, further comprising a fixing member configured to fix, to the housing, the holding member prevented from moving by the movement preventing section.

9. The image forming apparatus according to claim 1, wherein the unfixing section includes a locking member fixed to the housing, after the holding member is positioned in the housing, the locking member coming into contact with a part of the bearing member and stopping the movement of the bearing member in the second direction according to an operation for sliding the holding member in the second direction with respect to the housing.

10. The image forming apparatus according to claim 9, wherein the locking member includes a locking claw that comes into contact with an end face on a downstream side in the second direction of the bearing member and stops the bearing member.

11. A copy machine, comprising:

an automatic document feeder;

a housing to which a cylindrical image bearing body is rotatably attached;

a charging roller configured to come into contact with a surface of the image bearing body and charge the surface to a predetermined potential;

an image forming section configured to form an image on a charged surface of the image bearing body;

a bearing member rotatably supporting a rotating shaft of the charging roller;

a holding member configured to hold the bearing member in a state in which the charging roller is movable in a first direction orthogonal to the rotating shaft;

an urging member configured to urge the bearing member in the first direction with respect to the holding member;

a fixing section configured to fix the bearing member in a first position on an upstream side in the first direction with respect to the holding member; and an unfixing section configured to, in a state in which the bearing member is fixed in the first position with respect to the holding member by the fixing section, separate the charging roller from the surface of the image bearing body so as to be opposed to the surface and position the holding member in the housing and, thereafter, unfix the bearing member fixed by the fixing section with an operation for sliding the holding member in a second direction parallel to the rotating shaft, move the bearing member to a second position on a downstream side in the first direction with an urging force of the urging member, and bring the charging roller into contact with the surface of the image bearing body.

12. The copy machine according to claim 11, wherein the holding member is a part of a case including an opening section for projecting the charging roller toward the image bearing body in a state in which the charging roller is positioned in the housing, the case housing the bearing member via the urging member and housing the charging roller.

13. The copy machine according to claim 12, wherein the bearing member rotatably supports a rotating shaft of a cleaning roller that cleans the charging roller, and the case houses the cleaning roller.

14. The copy machine according to claim 11, wherein the urging member is a coil spring that changes to a straight shape parallel to the first direction in a state in which the bearing member is moved to the second position and is deformable into a shape nonparallel to the first direction if the bearing member is moved to the first position.

15. The copy machine according to claim 11, wherein the fixing section includes an engaging projecting section extending to one of the bearing member and the holding member in the second direction and an engaging groove extending to another of the bearing member and the holding member in the second direction, the engaging projecting section at least partially fits in the engaging groove in a state in which the bearing member is fixed in the first position with respect to the holding member, and the engaging projecting section is disengaged from the engaging groove by sliding the holding member in the second direction with respect to the bearing member in a state in which the bearing member is fixed in the first position with respect to the holding member.

16. The copy machine according to claim 11, further comprising a movement preventing section configured to prevent the holding member from moving in an opposite direction of the second direction in a state in which the holding member is slid in the second direction to unfix the bearing member fixed by the fixing section.

17. The copy machine according to claim 16, wherein the movement preventing section includes an engaging claw provided in one of the housing and the holding member and an engaging recess provided in another of the housing and the holding member, the engaging recess engaging with the engaging claw according to an operation for sliding the holding member in the second direction.

18. The copy machine according to claim 16, further comprising a fixing member configured to fix, to the housing, the holding member prevented from moving by the movement preventing section.

19. The copy machine according to claim 11, wherein the unfixing section includes a locking member fixed to the housing, after the holding member is positioned in the housing, the locking member coming into contact with a part of the bearing member and stopping the movement of the bearing member in the second direction according to an operation for sliding the holding member in the second direction with respect to the housing.

20. The copy machine according to claim 19, wherein the locking member includes a locking claw that comes into contact with an end face on a downstream side in the second direction of the bearing member and stops the bearing member.

* * * * *